United States Patent [19]

Hsie et al.

[11] Patent Number: 5,256,249
[45] Date of Patent: Oct. 26, 1993

[54] METHOD OF MANUFACTURING A PLANARIZED MAGNETORESISTIVE SENSOR

[75] Inventors: Wei C. Hsie, Eden Prairie; Michael M. Collver, Afton, both of Minn.

[73] Assignee: Seagate Technology, Inc., Scotts Valley, Calif.

[21] Appl. No.: 761,001

[22] Filed: Sep. 17, 1991

[51] Int. Cl.⁵ ............................ B44C 1/22; C23F 1/00
[52] U.S. Cl. .................................. 156/656; 29/603; 156/659.1; 156/661.1; 156/667
[58] Field of Search ............ 156/655, 656, 657, 659.1, 156/661.1, 667; 427/130, 131; 204/192.15, 192.36; 29/603, 620, 621.1; 360/113, 121

[56] References Cited

U.S. PATENT DOCUMENTS

| | | | |
|---|---|---|---|
| 4,436,593 | 3/1984 | Osborne et al. | 204/15 |
| 4,481,071 | 11/1984 | Anderson et al. | 156/656 |
| 4,685,014 | 8/1987 | Hanazono et al. | 360/126 |
| 4,791,719 | 12/1988 | Kobayashi et al. | 29/603 |
| 4,803,580 | 2/1989 | Mowry | 360/113 |
| 4,837,924 | 6/1989 | Lazzari | 29/603 |
| 4,860,139 | 8/1989 | Hamilton | 360/126 |
| 4,875,987 | 10/1989 | Wada et al. | 204/192.15 |
| 4,891,725 | 1/1990 | Mowry | 360/113 |
| 4,940,511 | 7/1990 | Fontana, Jr. et al. | 156/656 |
| 4,949,207 | 8/1990 | Lazzari | 360/119 |
| 4,966,648 | 10/1990 | Nakamura et al. | 156/643 |
| 4,992,901 | 2/1991 | Keel et al. | 360/110 |
| 4,996,165 | 2/1991 | Chang et al. | 437/31 |

*Primary Examiner*—William A. Powell
*Attorney, Agent, or Firm*—Kinney & Lange

[57] ABSTRACT

A magnetoresistive sensor includes a track width oxide layer which overlies a magnetoresistive element. Etch stop layers lie on opposite sides of the magnetoresistive element adjacent a magnetoresistive element. Contact/boundary control layers overlie the etch stop layer and lie adjacent the track width oxide layer. A separate loft oxide layer overlies the contact/boundary control layers and the track width oxide layer. The magnetoresistive sensor is formed by depositing a track width oxide to a thickness of the contact/boundary control layers.

13 Claims, 6 Drawing Sheets

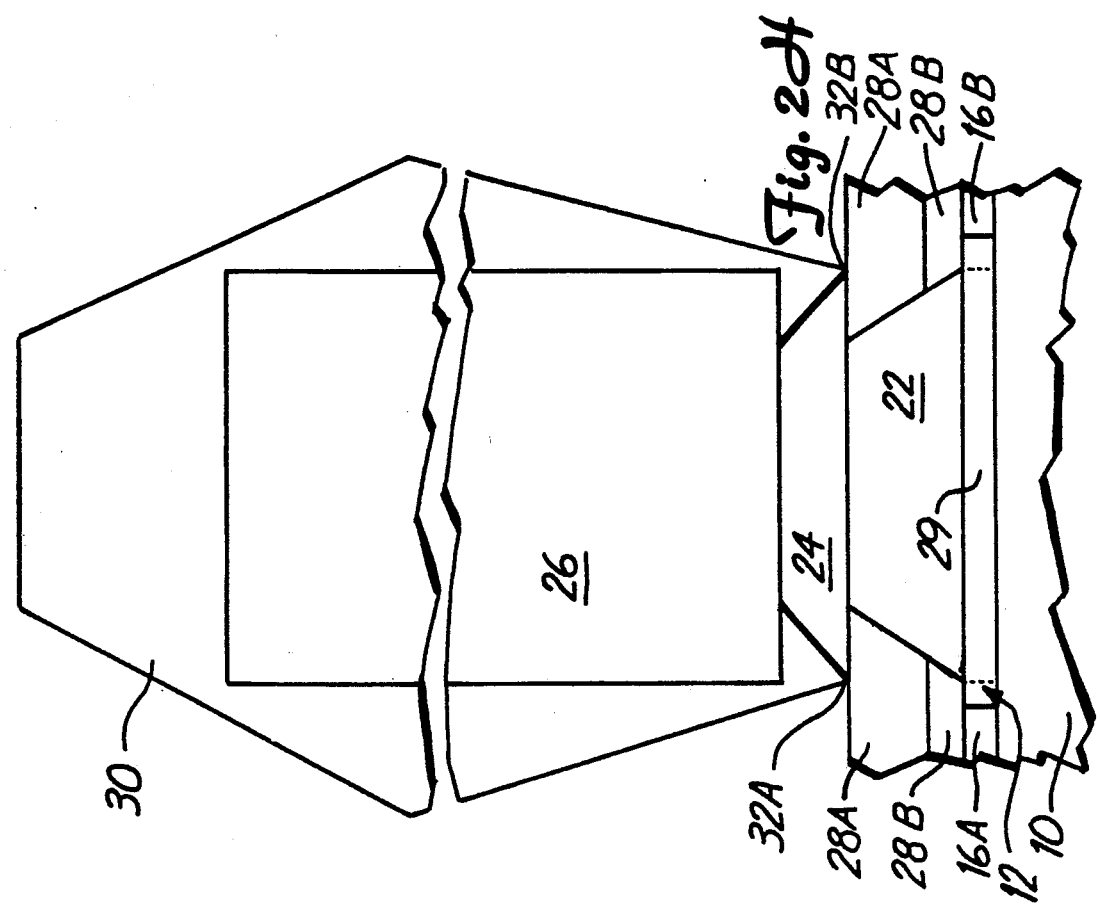
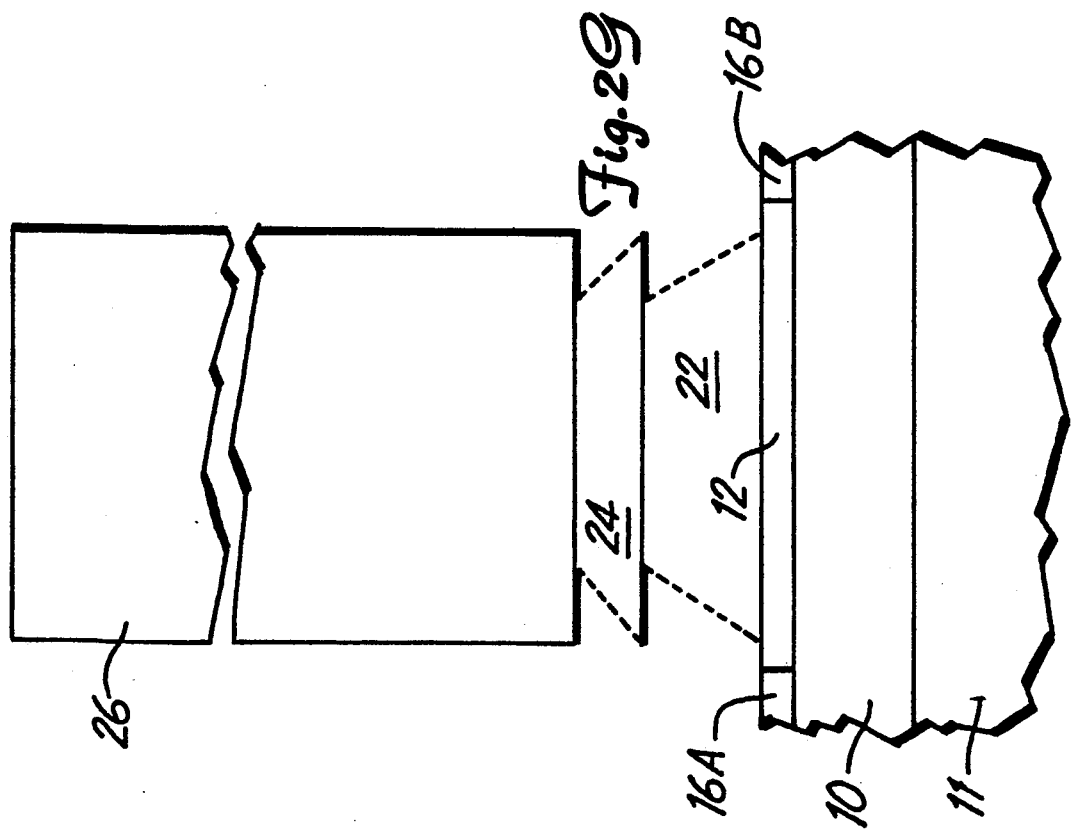

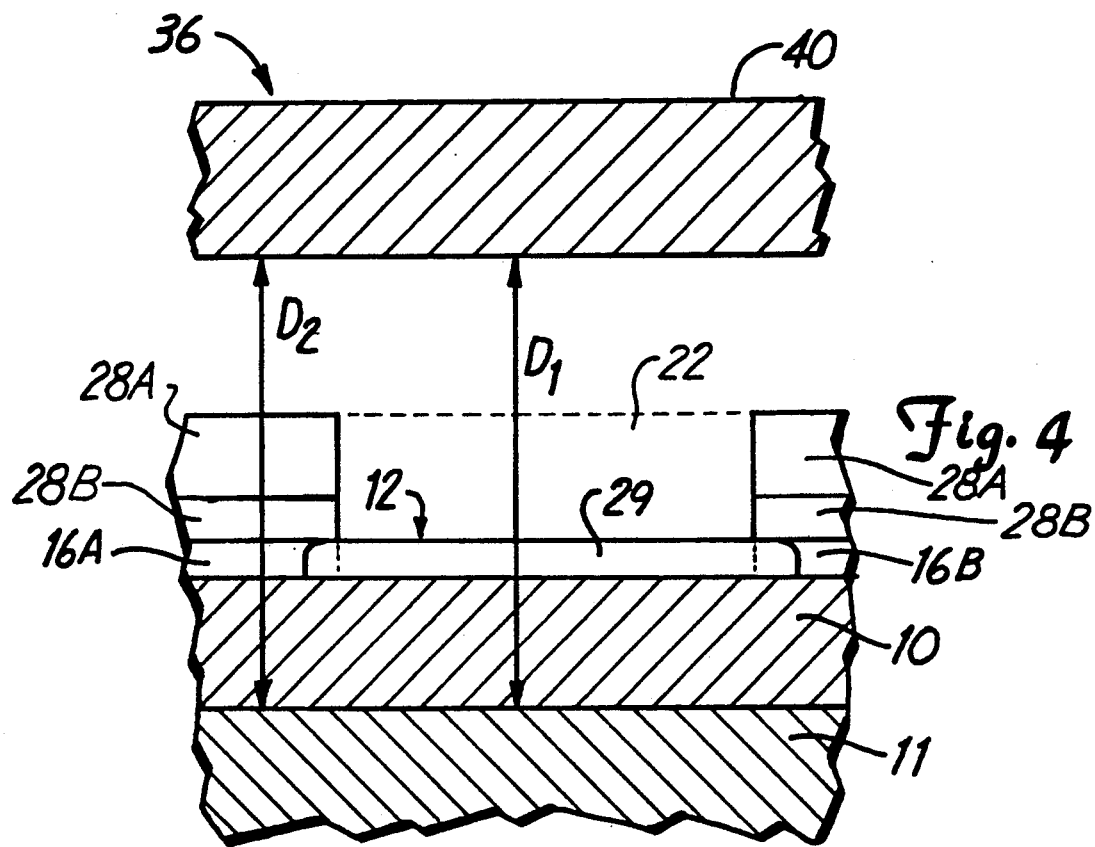

METHOD OF MANUFACTURING A PLANARIZED MAGNETORESISTIVE SENSOR

BACKGROUND OF THE INVENTION

The present invention relates to magnetoresistive heads. In particular, the present invention relates to a planarized magnetoresistive head.

Magnetoresistive sensors can be used to sense magnetically encoded information. In operation, a sense current is passed through a magnetoresistive element. Presence of a magnetic field changes the resistance of a magnetoresistive element. Change in voltage drop across the MR element due to the change of the resistance of the MR element can be measured and used to recover magnetically stored information.

These sensors typically comprise a thin strip of NiFe alloy (Permalloy) magnetized along an easy axis of low coercivity. Many other ferromagnetic alloys are also candidates. The strips are usually mounted in the head so that the easy axis is transverse the direction of disc rotation and parallel to the plane of the disc. The magnetic flux from the disc causes rotation of the magnetization vector of the strip, which in turn causes a change in resistivity to a sense current flowing between lateral contacts. The resistivity varies according to difference of the cosine-squared of the angle between the magnetization vector and the current vector with and without the presence of an external magnetic field. Due to this cosine-squared relationship, if the magnetization and current vectors are initially aligned, the initial change in resistivity due to disc magnetic flux is low and unidirectional. Typically, therefore, either the easy axis magnetization vector or the current vector is biased to approximately 45° to increase responsiveness to angular change in the magnetization vector and to linearize the sensor output.

The sensor itself comprises a strip of magnetoresistive material deposited on a magnetic shield layer to form a magnetoresistive element. A series of deposition and etching processes form an active region from a portion of the magnetoresistive element. The active region is the area of the sensor that senses magnetic flux from the magnetic storage medium. An upper magnetic shield acts as a barrier between the sensor and the surface of the magnetic storage medium to prevent flux passing by the sensor from linking back to the sensor. The magnetic shield also serves to protect the sensor from receiving stray magnetic flux from surrounding magnetic storage media.

One problem which affects performance of magnetoresistive heads is the degree to which surfaces in the sensor can be made flat or "planarized." In particular, in prior art sensors, the upper shield has a dip just above the active region of the magnetoresistive element. This degrades off-track performance. Lack of planarization can also cause an electrical short between the magnetoresistive element and the upper shield. This can reduce yields during manufacture. Attempts at planarization of magnetoresistive sensors have focused on etching of a boundary control layer. This can damage the structure of the magnetoresistive head and adversely affect stabilization of the magnetoresistive element.

SUMMARY OF THE INVENTION

The present invention is a planarized magnetoresistive head for reading magnetically stored information. The present invention provides an improved magnetoresistive sensor which has a generally planarized surface. The magnetoresistive sensor includes a magnetoresistive element which has an overlying track width oxide. Etch stop layers lie on opposite sides of the magnetoresistive element, adjacent the magnetoresistive element. Contact/boundary control layers overlie the etch stop layer and are positioned adjacent the track width layer. A loft oxide layer overlies the contact/boundary control layers and the track width oxide layer. An inductive write head can be deposited adjacent the magnetoresistive sensor to form a magnetoresistive read/write head.

The present invention includes a method of forming a planarized magnetoresistive sensor. A magnetoresistive element is deposited on an oxide basecoat which overlays a magnetic shield layer. A photoresist mask is deposited over the magnetoresistive element and an etch stop layer is deposited. The photoresist layer is removed which lifts off a portion of the etch stop layer and leaves portions of the etch stop layer which lie on either side of the magnetoresistive element. A track width oxide layer and a metal mask layer are deposited over the structure. A photoresist mask is deposited on the metal mask layer and an oxide etch is applied. The oxide etch removes a portion of the track width oxide and leaves the track width oxide and metal mask which overlie the magnetoresistive element and are covered by the photoresist mask. Contact/boundary control layers are deposited to the thickness of the track width oxide layer and adjacent the track width oxide layer. A selective metal etch is applied which etches the metal mask layer. A photoresist stripper is used to lift off the photoresist mask and the contact/boundary control layers associated with it. A loft oxide layer is deposited over the contact/boundary control layers and the track width layer.

BRIEF DESCRIPTION OF THE DRAWINGS

FIGS. 2A-2J illustrate steps of fabricating a magnetoresistive sensor in accordance with the method of the present invention.

FIG. 4 is a cross-sectional view of the magnetoresistive sensor of FIG. 3.

DETAILED DESCRIPTION OF THE PREFERRED EMBODIMENTS

Figure 1:
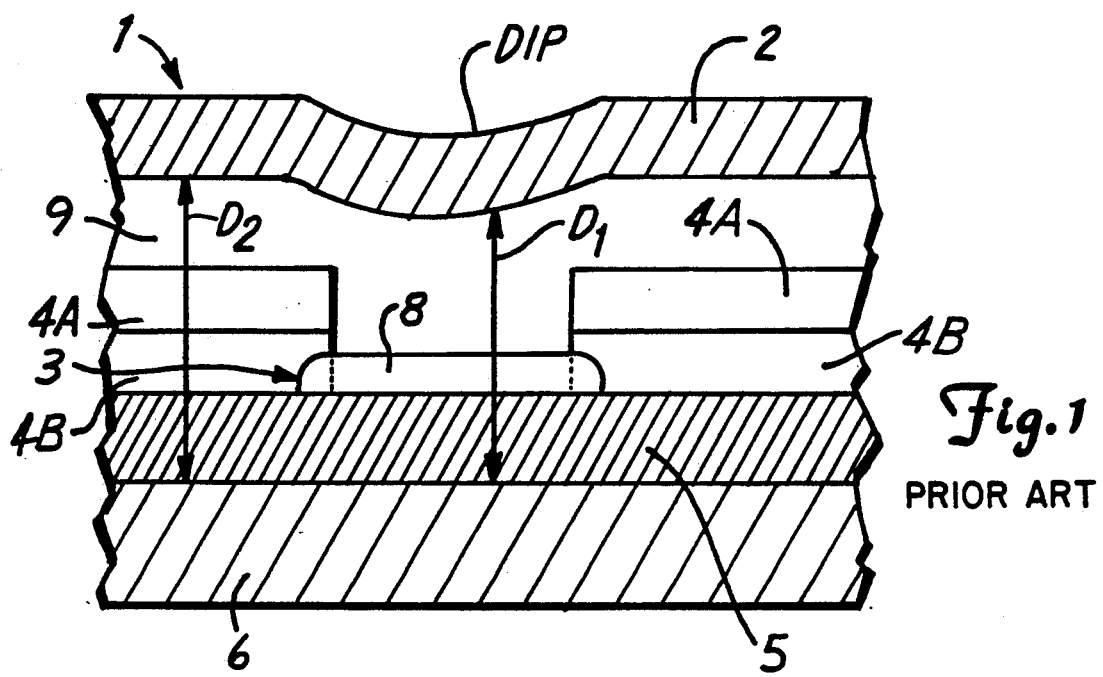
FIG. 1 shows a prior art magnetoresistive sensor.

FIG. 1 shows a prior art magnetoresistive sensor 1 as viewed from a surface of a magnetic storage medium. Sensor 1 includes a lower pole tip/upper shield 2, a magnetoresistive element 3 and contact/boundary control layers 4A and 4B. Magnetoresistive element 3 is deposited on an oxide basecoat 5 which overlies a shield 6. Contact/boundary control layers 4A and 4B are then deposited. Shield 2 shields an active region 8 of magnetoresistive element 3 from stray magnetic flux. A dip in the lower pole tip 2 causes the distance between shield 2 and shield 6 to vary. Shields 2 and 6 protect the magnetoresistive sensor 1 from stray magnetic flux. Contact/boundary control layers 4A and 4B are deposited, patterned, and etched such that there is a cavity over active region 8. An oxide layer 9 is deposited over contact material 4A and 4B and active region 8. The cavity between contact 4A and contact 4B causes oxide layer 9 to have a dip. Since shield 2 is deposited on oxide layer 9, shield 2 has a dip as shown in FIG. 1.

Off track performance is degraded when an uneven surface of the upper shield/lower pole tip 2 causes the distance between shields 2 and 6 to vary. FIG. 1 shows distances $D_1$ and $D_2$ between shields 2 and 6. Distance $D_1$ is directly under the dip and aligned with active region 8. Distance $D_2$ is greater than distance $D_1$ and is not aligned with active region 8. It has been discovered that the gap formed between shields 2 and 6 having distance $D_2$ allows magnetic flux to penetrate more into an undesirable region. This effectively widens the track width of active region 8, which limits maximum storage density and degrades off track performance.

A more severe problem occurs when poor step coverage of active region 8 causes an electrical short between the contact/boundary control layers 4A and 4B and shield 2. The dip in shield 2, if large enough, can cause shield 2 to touch contacts 4A and 4B. Any contact between shield 2 and contact/boundary control layers 4A and 4B will cause an electrical short and render magnetoresistive head 1 useless.

The present invention provides a magnetoresistive sensor having a "planarized" oxide layer and top shield layer. In the present invention, the distance between the lower shield and the upper shield is relatively constant in comparison to prior art designs. This improves off track performance and reduces the tendency for the upper shield to short out the electrical contacts.

FIGS. 2A through 2J show steps used to form a planarized magnetoresistive head in accordance with the present invention.

Figure 2A:
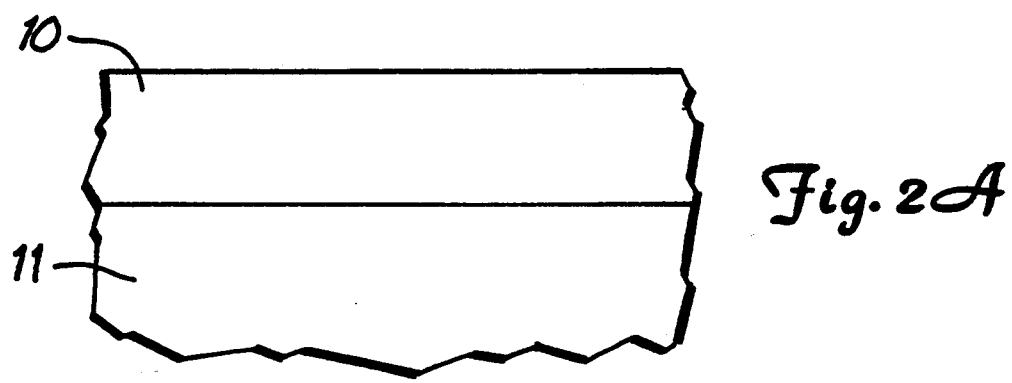

FIG. 2A shows an alumina ($Al_2O_3$) basecoat 10 which is deposited upon a magnetic layer 11. Magnetic layer 11 forms a lower magnetic shield. Alumina layer (basecoat) 10 is a non-magnetic oxide layer which serves to carry the magnetoresistive sensor.

Figure 2B:
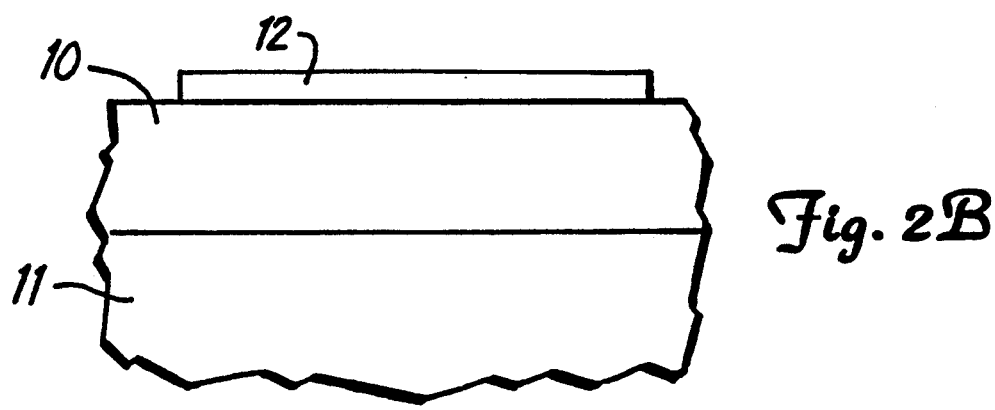

FIG. 2B shows alumina layer 10 underlying a magnetoresistive element 12. Magnetoresistive element 12 is evaporated or sputtered onto alumina layer 10. Magnetoresistive element 12 is deposited in a uniform magnetic field which is directed along an easy axis of magnetization.

Figure 2C:
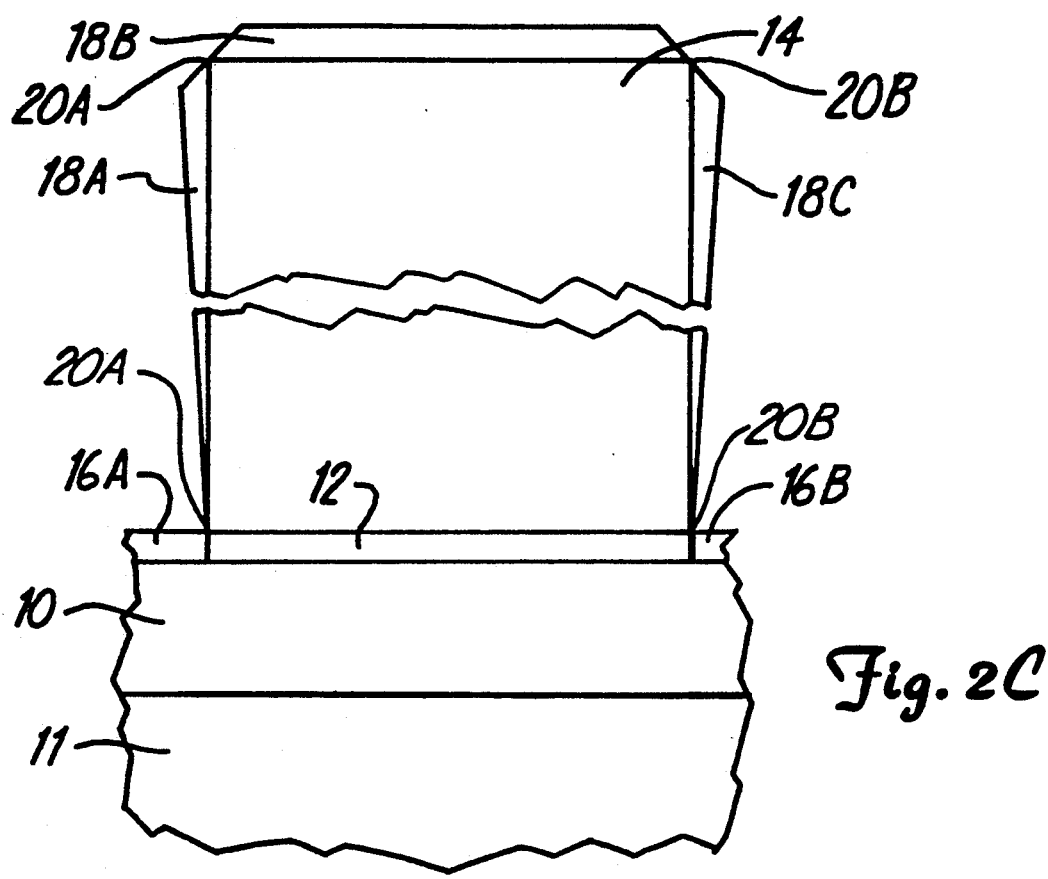

FIG. 2C shows a photoresist layer 14 which is deposited over magnetoresistive element 12 to pattern the magnetoresistive element 12. Photoresist layer 14 is deposited using standard photolithographic techniques. Molybdenum is sputtered over the surface of substrate 12 and photoresist layer 14 which forms layers 16A, 16B, 18A, 18B, and 18C. Molybdenum layers 16A and 16B are deposited on alumina layer 10. Molybdenum 16A, 16B, 18A, 18B, and 18C is deposited so that corners 20A and 20B of photoresist layer 14 are exposed. Molybdenum layers 16A and 16B form an alumina etch stop during a subsequent step of etching.

Figure 2D:
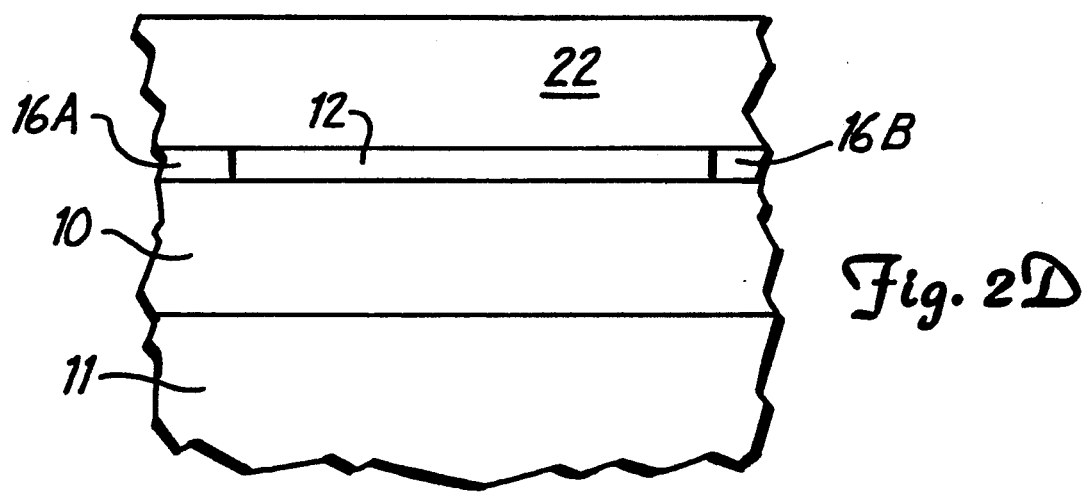
Figure 2E:
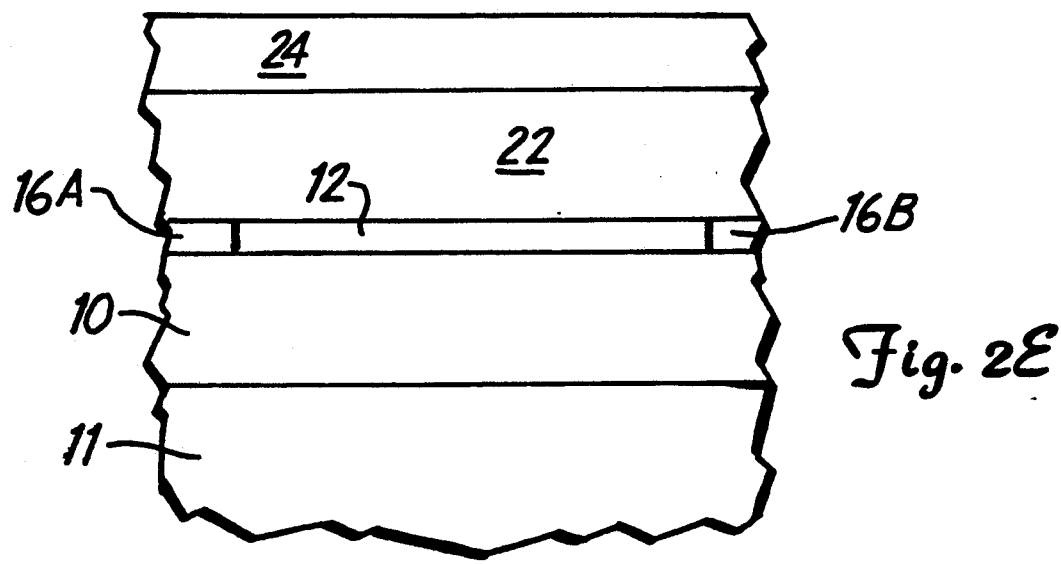

Photoresist layer 14 is stripped by a conventional photoresist stripper, which causes lift-off of molybdenum layers 18A, 18B, and 18C. Molybdenum layers 16A and 16B prevent the photoresist etchant from reaching alumina basecoat 10. After photoresist layer 14 is stripped, a track width oxide layer 22 is deposited on molybdenum layers 16A and 16B and magnetoresistive element 12. Track width oxide layer 22 comprises a layer of alumina, $Al_2O_3$. In FIG. 2D, track width oxide layer 22 extends beyond the edges of magnetoresistive element 12. A metal mask layer 24 is deposited over track width oxide 22. Metal mask layer 24 is shown in FIG. 2E. In a preferred embodiment, metal mask layer 24 comprises copper.

Figure 2F:
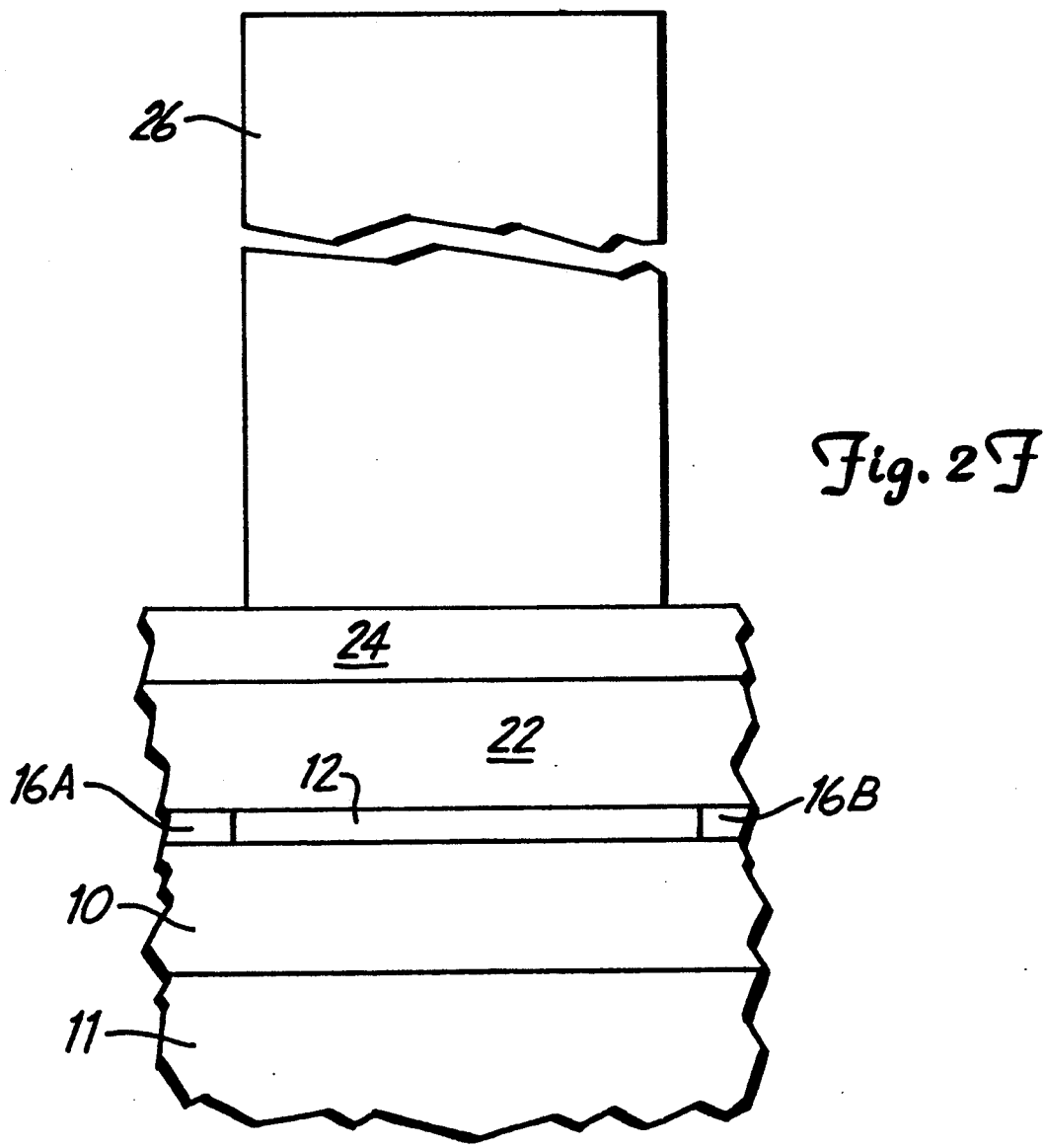

FIG. 2F shows a photoresist mask layer 26 deposited upon metal mask layer 24 to define the track width of oxide layer 22.

Following deposition of photoresist mask layer 26, a metal etchant is applied to define the pattern of metal mask layer. An oxide etchant is applied sequentially to define the track width of oxide layer 22. In a preferred embodiment, photoresist layer 26 should have a thickness of between about 6 microns and about 9 microns. FIG. 2G shows track width oxide layer 22 following application of the oxide etchant. During the etching process, mask layers 16A and 16B protect the underlying alumina layer 10 from the etchant. Photoresist mask layer 26 and metal mask 24 prevent track width oxide layer 22 from being completely removed. This yields the undercut structure of track width oxide layer 22 which is shown in FIG. 2F.

FIG. 2H shows contact/boundary control layers 28A and 28B which contact molybdenum layers 16A and 16B and magnetoresistive element 12. Boundary/control layers 28A and 28B are deposited to the thickness of track width oxide 22. Contact/boundary control layers 28A and 28B, and track width oxide 22 define an active region 29 of magnetoresistive element 12. Contact/boundary control layers 28A and 28B are deposited using evaporation or sputtering, for example. During deposition of boundary control layers 28A and 28B, a portion of the deposition material is deposited upon photoresist mask layer 26 and metal mask layer 24 and forms layer 30. Note that corners 32A and 32B of metal mask layer 24 are exposed through layer 30, as shown in FIG. 2H. In a preferred embodiment, boundary control layers 28A and 28B comprise FeMn.

Figure 2I:
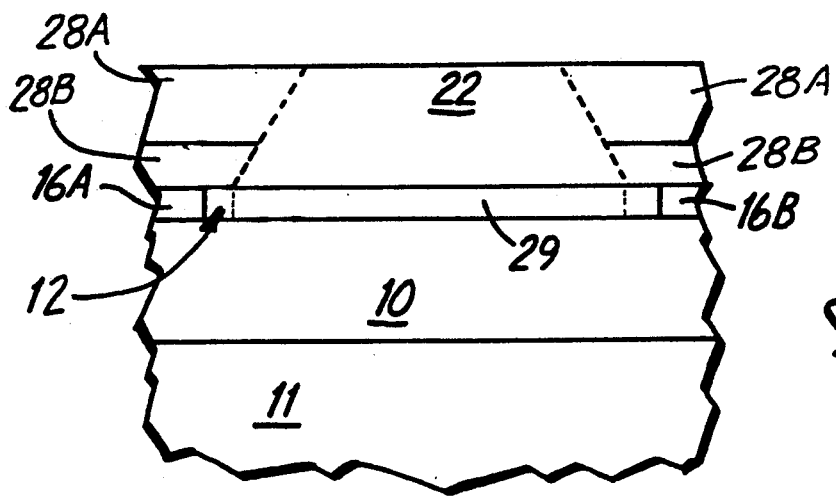
Figure 2J:
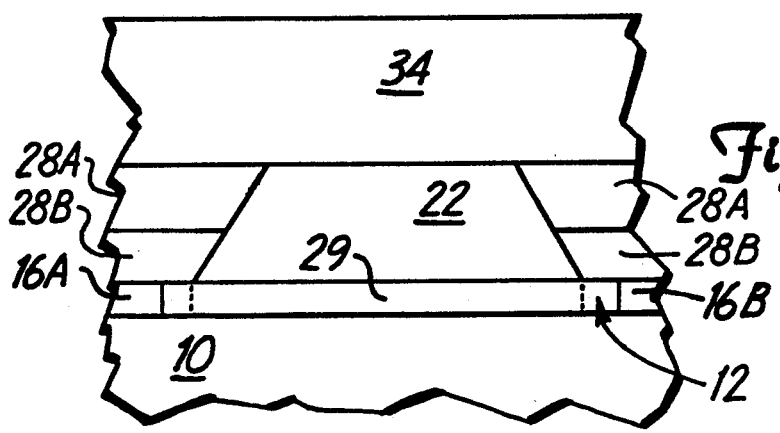

Photoresist mask layer 26 and layer 30 are removed through lift-off. A copper etch is applied subsequently which etches copper layer 24. FIG. 2I shows the structure following copper etching. As shown in FIG. 2I, contact/boundary control layers 28A and 28B and track width oxide layer 22 are substantially "planarized," i.e. flat. Following application of a copper etchant to remove copper layer 24, a loft oxide layer 34 is deposited over contact/boundary control layers 28A and 28B and track width oxide layer 22 as shown in FIG. 2J. Following deposition of the loft oxide layer 34, a top shield 40 (shown in FIGS. 3 and 4) is deposited.

Figure 3:
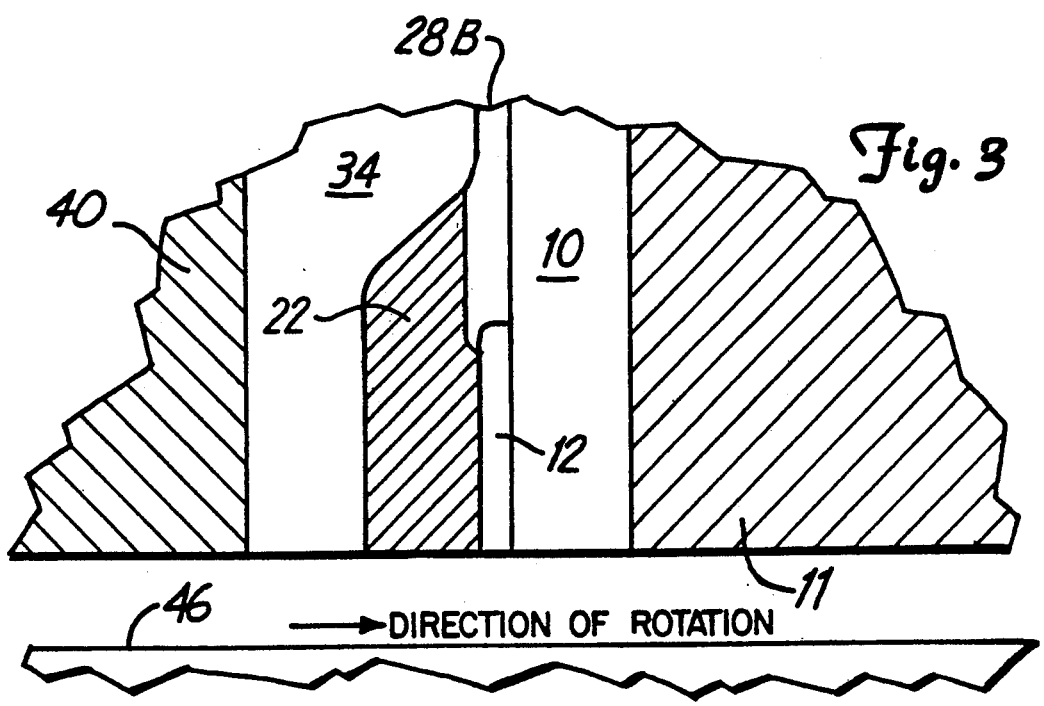
FIG. 3 shows a magnetoresistive sensor in accordance with the present invention as viewed from a magnetic storage medium.

FIG. 3 shows a cross-sectional view of a completed magnetoresistive sensor 36 made in accordance with the present invention. Magnetoresistive sensor 36 includes magnetoresistive element 12 mounted between shields and 40 above a magnetic disc 46. Magnetoresistive element 12 sits on oxide layer 10 which overlies a magnetic layer 11. In FIG. 4 contact/boundary control layer 28B is deposited directly over a portion of magnetoresistive element 12. Loft oxide layer 34 overlies contact/boundary control layer 28A.

FIG. 4 shows the same cross-sectional view as FIG. 1, except that is shows an embodiment of the present invention. Magnetoresistive element 12 is deposited on oxide layer 10 which overlies a magnetic layer 11. Molybdenum layers 16A and 16B are deposited adjacent to each side of the magnetoresistive element 12. Contact/boundary control layers 28A and 28B are deposited over the molybdenum etch stop layers 16A and 16B.

Due to the planar nature of the upper shield, there is a substantially constant distance between the shields 11 and 40. For example, a distance $D_1$ between top shield 40 and lower shield 11 near active region 29 is about the same as a distance $D_2$ shown in FIG. 4. The relatively constant spacing reduces the amount of excess flux channeled into active region 29 in comparison to prior art designs. Also, the substantially planar surface will reduce the likelihood of an electrical short. Distances $D_1$ and $D_2$ are within about 500 to about 1000 Angstroms of each other.

The present invention provides a substantially planar magnetoresistive sensor. This structure improves off-track performance while maintaining stabilization of the magnetoresistive element using a boundary control layer which has good edge definition. Furthermore, the present invention reduces the likelihood of an electrical short between the lower pole tips/upper shield and the magnetoresistive element and contact material. The structure of the present invention is achieved using a separate track width oxide which has a thickness substantially the same as the thickness of the contact-/boundary control layers. The method of the present invention includes the use of etch stop layers and a number of lift-off steps.

Although the present invention has been described with reference to preferred embodiments, workers skilled in the art will recognize that changes may be made in form and detail without departing from the spirit and scope of the invention.

What is claimed is:

1. A method of manufacturing a magnetoresistive sensor comprising:
   depositing a magnetoresistive element having an active region upon a substrate;
   depositing a track width oxide layer over the active region of the magnetoresistive element;
   applying a sacrificial mask layer over the track width oxide layer;
   depositing a contact material over the sacrificial mask layer and adjacent the track width oxide layer;
   lifting off a portion of the contact material, thereby forming first and second contacts adjacent the active region and electrically coupled to the active region; and
   removing the sacrificial mask layer.

2. The method of claim 1 including:
   depositing first and second etch stop layers adjacent the magnetoresistive element prior to the step of depositing the contact material.

3. The method of claim 2 wherein depositing the first and second etch stop layers comprises depositing molybdenum.

4. The method of claim 1 including:
   depositing a photoresist mask defines the sacrificial mask, prior to the step of depositing the contact material.

5. The method of claim 4 wherein depositing the photoresist mask comprises depositing the photoresist mask to a thickness in a range from about 6 microns to about 9 microns.

6. The method of claim 1 wherein applying the sacrificial mask layer comprises depositing a copper sacrificial mask layer.

7. The method of claim 1 including:
   depositing a loft layer overlying the contact material wherein the loft layer is formed separately from the track width oxide layer.

8. A method of manufacturing a magnetoresistive sensor comprising:
   depositing a magnetoresistive element having an active region upon a substrate;
   depositing a track width oxide layer having a thickness over the active region of the magnetoresistive element;
   depositing a contact/boundary control layer adjacent the track width oxide layer and to the thickness of the track width oxide layer;
   depositing a separately formed loft layer over the contact/boundary control layer and the track width oxide layer; and
   depositing a magnetic shield over the loft layer.

9. The method of claim 8 including:
   depositing first and second etch stop layers adjacent the magnetoresistive element prior to the step of depositing the track width oxide layer.

10. The method of claim 8 including:
    depositing a photoresist mask over the magnetoresistive element prior to depositing the track width oxide layer.

11. The method of claim 8 including:
    applying an oxide etch prior to depositing the contact/boundary control layer and subsequent to depositing the track width oxide layer.

12. The method of claim 8 including:
    depositing a sacrificial mask layer over the track width oxide layer prior to depositing the contact-/boundary control layer.

13. The method of claim 12 including:
    lifting off a portion of the contact/boundary control layer, thereby forming first and second contacts adjacent the active region and electrically coupled to the active region; and
    removing the sacrificial mask layer.

* * * * *

UNITED STATES PATENT AND TRADEMARK OFFICE
CERTIFICATE OF CORRECTION

PATENT NO. : 5,256,249
DATED : October 26, 1993
INVENTOR(S) : WEI C. HSIE, MICHAEL M. COLLVER It is certified that error appears in the above-identified patent and that said Letters Patent is hereby corrected as shown below:

Col. 6, line 43, delete "contact-", insert --"contact/"--

Signed and Sealed this

Twenty-third Day of May, 1995

Attest:

BRUCE LEHMAN

*Attesting Officer*    *Commissioner of Patents and Trademarks*